(12) United States Patent
Walker (10) Patent No.: US 7,012,349 B1
(45) Date of Patent: Mar. 14, 2006

(54) MACHINED ROTOR ASSEMBLY AND METHOD OF MAKING SAME

(75) Inventor: James M. Walker, Fond du Lac, WI (US)

(73) Assignee: R. E. Phelon Company, Inc., Aiken, SC (US)

( * ) Notice: Subject to any disclaimer, the term of this patent is extended or adjusted under 35 U.S.C. 154(b) by 0 days.

(21) Appl. No.: 10/407,351

(22) Filed: Apr. 4, 2003

Related U.S. Application Data (60) Provisional application No. 60/370,402, filed on Apr. 4, 2002.

(51) Int. Cl.
*H02K 1/28* (2006.01)

(52) U.S. Cl. ............ 310/156.19; 310/153; 310/156.08; 310/156.26; 310/42; 310/68 B (58) Field of Classification Search .................. 310/74, 310/153, 156.12–156.13, 156.26, 171, 156.06, 310/42, 68 B, 156.17–156.19; 123/406.56, 123/617; 74/572; 322/47; 324/163–164
See application file for complete search history.

(56) References Cited

U.S. PATENT DOCUMENTS

| | | | |
|---|---|---|---|
| 2,856,550 A * | 10/1958 | Phelon | 310/153 |
| 3,034,005 A * | 5/1962 | Carr | 310/153 |
| 3,663,850 A * | 5/1972 | Phelon | 310/153 |
| 3,952,718 A | 4/1976 | Meyer | |
| 3,974,817 A * | 8/1976 | Henderson et al. | 123/149 D |
| 4,125,791 A | 11/1978 | Futterer | |
| 4,211,195 A * | 7/1980 | Zechlin | 123/335 |
| 4,219,752 A * | 8/1980 | Katou | 310/156.19 |
| 4,345,553 A * | 8/1982 | Magrane et al. | 123/406.57 |
| 4,381,465 A | 4/1983 | Renkl et al. | |
| 4,401,939 A | 8/1983 | Korbell | |
| 4,433,473 A * | 2/1984 | Benedetti | 29/598 |
| 4,454,439 A | 6/1984 | Okamoto et al. | |
| 4,475,052 A | 10/1984 | Okamoto et al. | |
| 4,563,606 A | 1/1986 | Fukasawa et al. | |
| 4,602,423 A | 7/1986 | Ulrich et al. | |
| 4,720,638 A | 1/1988 | Vollbrecht | |
| 4,748,361 A | 5/1988 | Ohnishi et al. | |
| 4,775,813 A | 10/1988 | Janson | |
| 4,812,695 A | 3/1989 | Parshall | |
| 4,873,962 A | 10/1989 | Safranek | |

(Continued)

FOREIGN PATENT DOCUMENTS

JP      6-292333    * 10/1994

*Primary Examiner*—Burton Mullins
(74) *Attorney, Agent, or Firm*—Nicholas A. Kees; Godfrey & Kahn, S.C.

(57) ABSTRACT

The present invention provides a single piece machined rotor comprising a shell having an upper lip and a lower lip, with a pocket formed between the upper lip and the lower lip for mounting magnets therein. The magnets are fixed in place within the inner sidewall of the rotor with an adhesive and spacers. The spacers are positioned between the magnets and are held in place on the shell of the rotor by fasteners. The spacers may be of any type of non-magnetic material that can absorb the heat of the engine. The rotor also preferably includes triggering protrusions and balancing cutouts machined into the shell of the rotor. The cutouts or grooves may be machined into the inner sidewall or the outer sidewall of the rotor. A plurality of timing teeth used for engine speed sensing maybe machined into the single piece rotor assembly. The present invention also contemplates a method of machining the entire rotor out of a single piece of material.

18 Claims, 6 Drawing Sheets

U.S. PATENT DOCUMENTS

| | | |
|---|---|---|
| 4,947,065 A | 8/1990 | Ward et al. |
| 4,973,871 A * | 11/1990 | Bisantz ................. 310/154.17 |
| 5,177,392 A | 1/1993 | Scott |
| 5,313,698 A | 5/1994 | Schaeftlmeier et al. |
| 5,397,975 A | 3/1995 | Syverson |
| 5,402,028 A | 3/1995 | Koeber et al. |
| 5,502,368 A | 3/1996 | Syverson et al. |
| 5,631,544 A | 5/1997 | Syverson et al. |
| 5,648,692 A | 7/1997 | Watanabe et al. |
| 5,653,208 A * | 8/1997 | Nakamura ............. 123/406.52 |
| 5,656,922 A | 8/1997 | LaVelle et al. |
| 5,693,995 A | 12/1997 | Syverson |
| 5,710,471 A | 1/1998 | Syverson et al. |
| 5,747,909 A | 5/1998 | Syverson et al. |
| 5,753,989 A | 5/1998 | Syverson et al. |
| 5,763,976 A | 6/1998 | Huard |
| 5,831,366 A | 11/1998 | Kern et al. |
| 5,914,551 A | 6/1999 | Kern et al. |
| 5,998,902 A * | 12/1999 | Sleder et al. ................ 310/153 |
| 6,031,305 A | 2/2000 | Satoh et al. |
| 6,051,898 A | 4/2000 | Sakamoto |
| 6,132,186 A | 10/2000 | Cooper et al. |
| 6,137,199 A * | 10/2000 | Lindsley ...................... 310/74 |
| 6,229,241 B1 | 5/2001 | Ishigami et al. |
| 6,236,134 B1 | 5/2001 | Syverson |
| 6,242,828 B1 | 6/2001 | Rose, Sr. |
| 6,339,271 B1 * | 1/2002 | Noble et al. ................... 310/74 |
| 6,349,796 B1 * | 2/2002 | Tauchi et al. ................ 187/393 |
| 6,661,132 B1 * | 12/2003 | Kobayashi ................. 310/51 |

* cited by examiner

MACHINED ROTOR ASSEMBLY AND METHOD OF MAKING SAME

CROSS-REFERENCE TO RELATED APPLICATIONS

This application claims the benefit of U.S. Provisional Application No. 60/370,402, filed Apr. 4, 2002, the disclosure of which is incorporated herein by reference.

BACKGROUND OF THE INVENTION

The present invention relates generally to a rotor assembly for an internal combustion engine, and more particularly to a single piece machined rotor or flywheel assembly with a plurality of magnets and spacers mounted thereto and a method of reducing the labor and cost of manufacturing a rotor for various types of engines using a permanent magnet ignition and/or charging system.

The present invention relates generally to an electrical system for an internal combustion engine, and more particularly to a charging system for a small internal combustion engine.

The electrical system of a small internal combustion engine typically comprises an ignition system and a charging system. The electrical system can be designed to produce either alternating current (AC) or direct current (DC). If the vehicle does not include a battery, an alternator of the electrical system operates like a generator, generating AC power as long as the engine is running. If the vehicle includes a battery, a rectifier is coupled to the alternator to convert AC power to DC power so that it can be stored in the battery and used to supply power to accessories even when the engine is off. Engines that operate at high speeds also generally require a regulator to maintain a steady voltage output.

The ignition system is responsible for starting the engine. Whether the engine is started with a tug on a rewind rope or by the turn of a key on an electric starter motor, the ignition system produces a spark inside the combustion chamber of the engine. The ignition system is coordinated with the timing of the piston and the motion of the valves so that the spark will ignite the air-fuel mixture in the combustion chamber just as the piston reaches the point of maximum compression in each engine cycle. Once the engine is running, the flywheel's inertia keeps the engine crankshaft spinning until the piston's next power stroke, while the flywheel magnets keep inducing a current in the armature to keep the spark plug firing.

The charging system is responsible for keeping the battery charged for starting the engine and powering the electrical accessories on a vehicle. When the engine starts running, the charging system takes over. The charging system becomes responsible for supplying energy to all of the loads when the engine is running and recharging the battery.

Typical charging systems include an ignition switch, an alternator, a rectifier, a regulator and a battery. When the ignition switch is in the ON position, the battery current energizes the alternator. The alternator generates and delivers electrical power to the battery and the rest of the electrical system. The alternator typically includes a stator and a rotor. The stator generally includes a plurality of windings wound around a plurality of poles extending outwardly from a core. The stator is mounted under the rotor with the rotor having a plurality of magnets mounted in the inside surface of the sidewall of the rotor. Rotation of the rotor creates a magnetic field and induces a current in the windings of the stator. On some engines, the stator includes an adjustable armature mounted outside of the rotor that relies on the same magnets as the ignition armature to charge the battery. The battery supplies all of the electrical power during cranking and when the engine is off. The rectifier converts AC power from the stator to DC power for charging the battery. The regulator maintains a steady voltage output.

Current methods for manufacturing a rotor for various types of engines are to machine a hub, stamp out an outside shell and fasten the components together. Most typical prior art rotor assemblies generally have a plurality of parts that require many steps in manufacturing and connecting the parts together. The prior art manufacturing methods include die casting, forming, stamping, and injection molding, which all require very expensive tooling and labor for assembling and fastening the multi-part rotor assemblies together.

Figure 1:
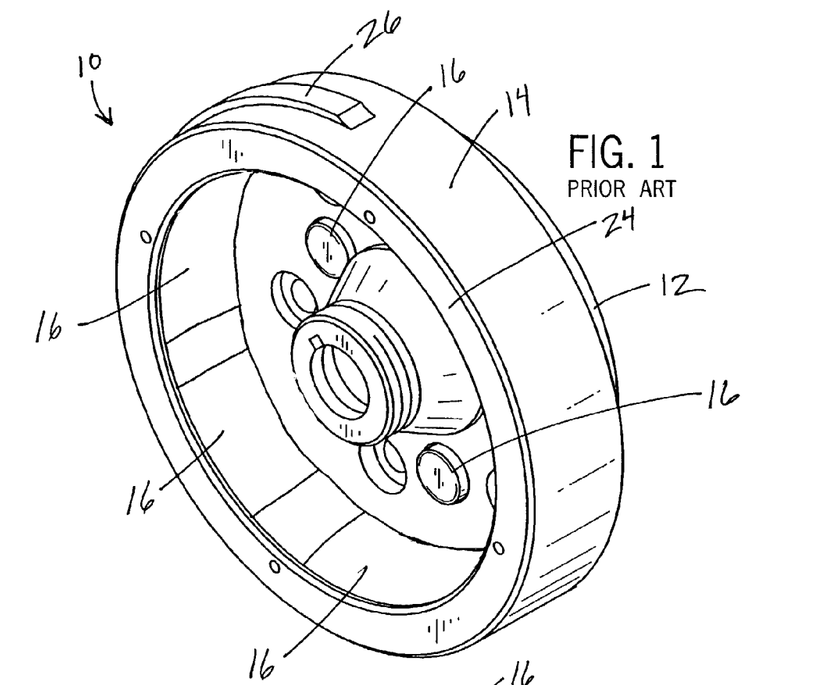
FIG. 1 is a top perspective view of an embodiment of a prior art rotor assembly.
Figure 2:
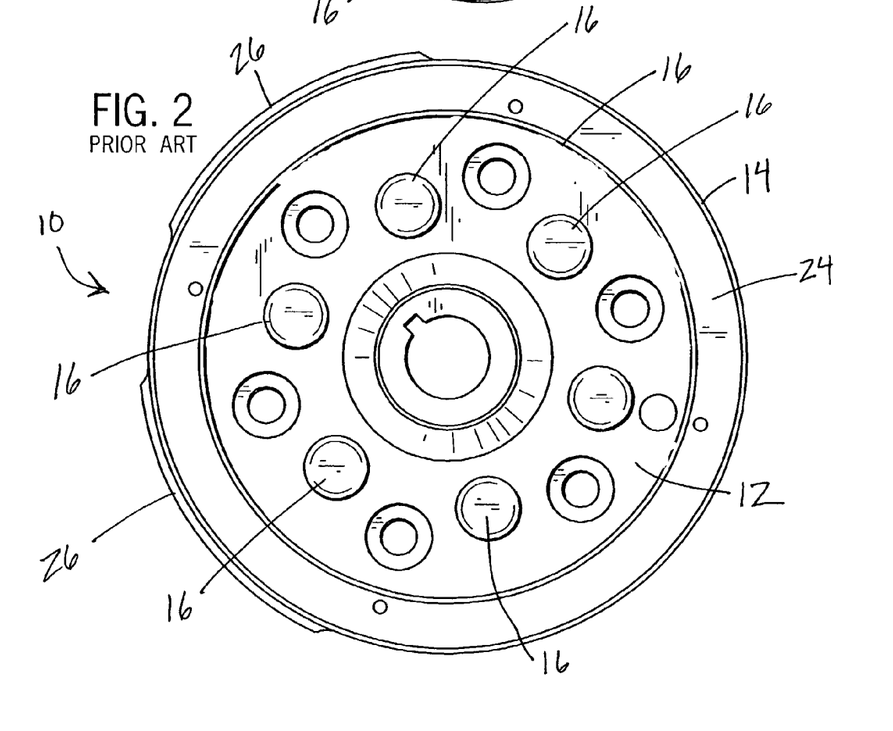
FIG. 2 is a top plan view of the prior art rotor assembly of FIG. 1.
Figure 3:
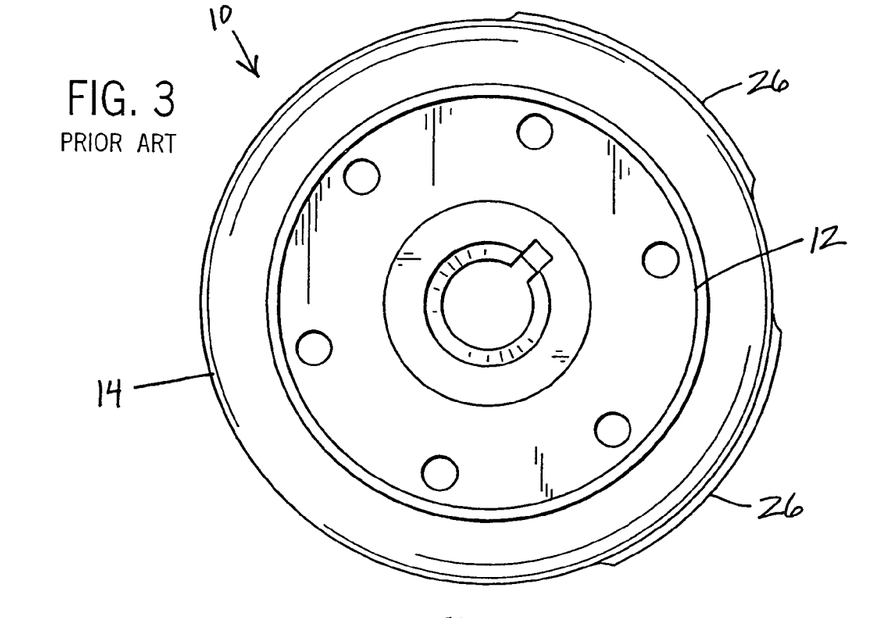
FIG. 3 is a bottom plan view of the prior art rotor assembly of FIG. 1.

FIGS. 1–3 illustrate an embodiment of a prior art rotor assembly 10 manufactured using expensive tooling, injection molding and other processes for constructing a multi-part rotor assembly. This prior art rotor assembly has a plurality of parts. A hub 12 is typically machined from a piece of steel. A stamping die is used to form an outside shell 14. The hub 12 is fastened to the outside shell 14 by rivets. A finishing machine is typically used to remove the rivet heads and smooth the surface of the rotor assembly. Magnets 16 are affixed to the inner surface of the outside shell 14 by an adhesive. A magnetic holding fixture is needed to hold the magnets in place around inner surface of outside shell 14 while the adhesive is curing. An injection molding machine is used for overmolding the magnets 16 to the outside shell 14, forming an injected molded part 24 in the outside shell 14. Overmolding is a process in which an elastomeric material is injected onto a product after the shell is produced. An embossing die may be used for forming ignition triggering protrusions 26 on the outer surface of the outside shell 14. Changing the size and diameter of the rotor assemblies would require additional tooling.

Figures 9, 10, 11:
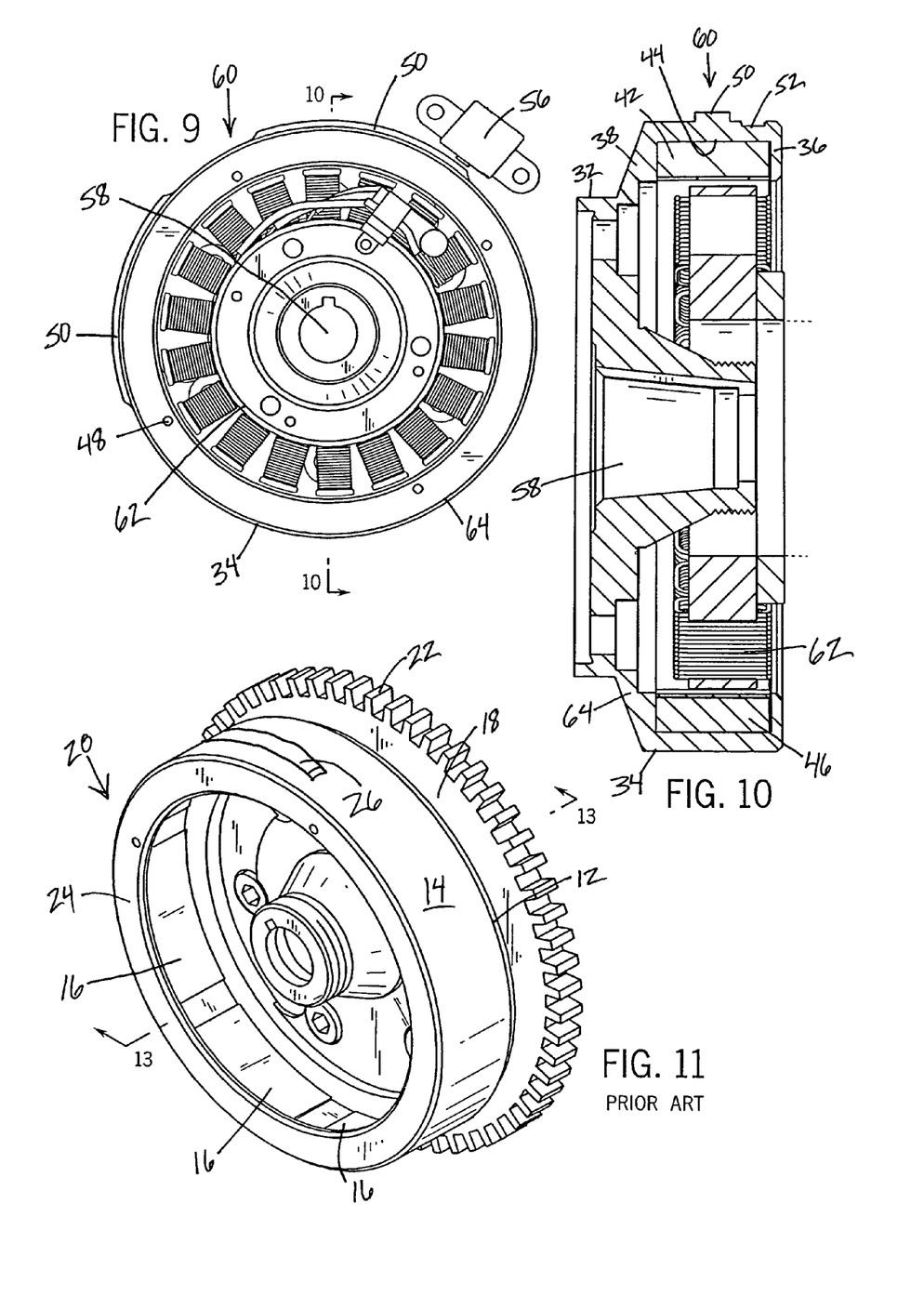
FIG. 9 is a top plan view of a charging assembly including a stator mounted within a rotor assembly constructed in accordance with the present invention.
FIG. 10 is a cross-sectional view of the charging assembly of FIG. 9, taken along line 10—10 of FIG. 9.
FIG. 11 is a perspective view of another embodiment of a prior art rotor assembly with an engine speed sensor ring fastened to the bottom thereof.
Figures 12, 13, 14:
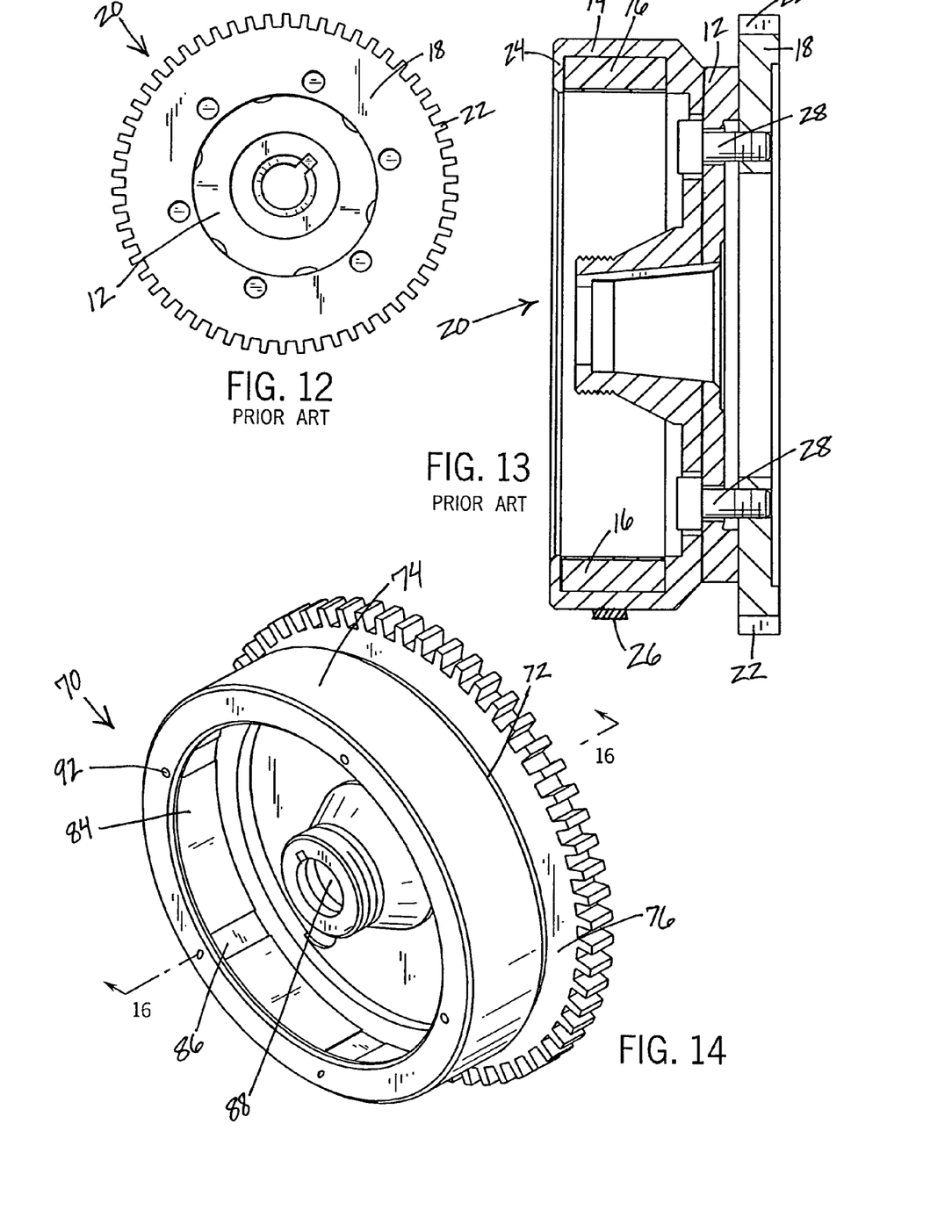
FIG. 12 is a bottom plan view of the prior art rotor assembly of FIG. 11.
FIG. 13 is a cross-sectional view of the prior art rotor assembly of FIG. 1, taken along line 13—13 of FIG. 11.
FIG. 14 is a top perspective view of another embodiment of a rotor assembly with an integral engine speed sensor ring machined in the bottom thereof constructed in accordance with the present invention.

FIGS. 11–13 illustrate another embodiment of a prior art rotor assembly 20 with an engine speed sensor ring 18 fastened to the bottom of the hub 12 with fasteners 28. The hub 12 is fastened to the outside shell 14 by rivets. Magnets 16 are affixed to the inner surface of the outside shell 14 by an adhesive. An injection molding machine is used for overmolding the magnets 16 to the outside shell 14, forming an injected molded part 24 in the outside shell 14. An embossing die may be used for forming ignition triggering protrusions 26 on the outer surface of the outside shell 14. The speed sensor ring 18 typically includes a plurality of timing teeth 22 of various configurations that are used for engine speed sensing.

Therefore, a need exists for an integral rotor assembly that is easier and less expensive to manufacture. The present invention provides an integral machined rotor assembly for use on various types of engines having a permanent magnet ignition and/or charging system. The integral rotor assembly of the present invention can be incorporated into a plurality of different power equipment internal combustion engines which require battery charging and/or electrical power generation.

SUMMARY OF THE INVENTION

The present invention provides a single piece machined rotor assembly comprising a shell having an upper lip and a lower lip, with a pocket formed between the upper lip and the lower lip for mounting magnets therein. The magnets are fixed in place within the inner sidewall of the rotor with an adhesive and spacers. The spacers are positioned between the magnets and are held in place on the shell of the rotor assembly by fasteners. The spacers may be of any type of non-magnetic material that can absorb the heat of the engine. The rotor assembly also preferably includes triggering protrusions and balancing cutouts machined into the shell of the rotor assembly. The cutouts or grooves may be machined into the inner sidewall or the outer sidewall of the rotor.

In another embodiment of the present invention, a rotor assembly includes a plurality of timing teeth with various configurations that are used for engine speed sensing that are machined into a single piece rotor assembly. Machining the teeth into the rotor assembly results in a reduction of tooling and assembly costs associated with the prior art rotor assemblies and with only minimal machining costs. An advantage of the rotor assembly of the present invention is that the hoop strength of the machined rotor is stronger than prior art rotor assemblies because of the machined in speed sensor ring on the outside diameter of the rotor assembly.

The present invention also contemplates the use of ceramic magnets, or rare earth magnets mounted within the shell of the rotor assembly. Also, thicker magnets than those used in the prior art may be used in the present invention to provide a tighter air gap and thus, increased performance of the internal combustion engine.

The present invention also contemplates a method of machining the entire rotor out of a single piece of metal, preferably steel. The beginning piece of metal for the entire rotor constructed in accordance with the present invention is only slightly larger than the beginning piece of metal for a prior art hub thus resulting in only slightly higher material cost and machining time. Machining the rotor assembly results in a plurality of rotor assembly depths and diameters that can be made to the rotor assembly of the present invention without any major labor or cost increases. No tooling is needed to change sizes of rotors. All that is necessary is programming changes in the machines.

The advantages of the present invention include the elimination of tooling costs associated with manufacturing prior art rotor assemblies, the elimination of the stamping die for forming the outside shell of prior art rotor assemblies, the elimination of rivet tooling used for attaching the hub to the outside shell of prior art rotor assemblies, the elimination of the finish machining of the rivet heads, the elimination of the overmolding protection of the magnets, the elimination of the embossing die for the ignition triggering protrusions, and the elimination of the magnet holding fixture for holding the magnets in place during curing of the adhesive when bonding the magnets to the inner sidewalls of the outside shell.

The present invention eliminates the stamping, die and tooling costs associated with forming and fastening multiple parts together. The rotor assembly of the present invention is faster and simpler to manufacture than prior art rotors. The rotor assembly of the present invention results in reduced manufacturing time and labor costs for manufacturing a less expensive single piece rotor.

Various other features, objects, and advantages of the invention will be made apparent to those skilled in the art from the accompanying drawings and detailed description thereof.

DETAILED DESCRIPTION OF THE INVENTION

Referring again to the drawings, FIGS. 4–8 illustrate an embodiment of a rotor assembly 30 constructed in accordance with the present invention. The present invention provides a single piece machined rotor assembly 30 comprising a circular hub 32 and a cylindrical shell 34 extending outwardly from one end of the hub 32, the shell 34 having an upper lip 36 and a lower lip 38 forming a pocket 40 for accepting magnets 42 therein. The hub 32 and shell 34 are machined as a single integral part from a single piece of metal that is roughly the same size used to create the hub of a prior art rotor assembly. The hub 32 preferably includes an opening 58 extending through the center thereof for mounting the rotor assembly 30 on the shaft of an internal combustion engine. The opening 58 is preferably keyed to ensure for proper mounting on the shaft of the internal combustion engine. The upper and lower lips 36, 38 help to hold the magnets 42 in place against the inner sidewall 44 of the shell 34. The magnets 42 are preferably attached to the inner sidewall 44 of the shell 34 with an adhesive, and mechanically secured in place with a plurality of spacers 46. The spacers 46 are preferably positioned between the magnets 42 and are held in place in the shell 34 of the rotor assembly 30 by fasteners 48. The spacers 46 may be made of any type of non-magnetic material that can absorb the heat of the internal combustion engine. The rotor assembly 30 also preferably includes at least one triggering protrusion 50 and at least one balancing cutout 52 machined in the hub 32 or shell 34 of the rotor assembly 30. The cutout or groove 52 may be machined into the inner sidewall 44, the outer sidewall 54 of the shell 34, or the hub 32. The triggering protrusion 50 is for triggering the ignition 56, FIG. 9, of the internal combustion engine. The protrusion 50 may create an imbalance in the rotor assembly, which must be balanced by the groove 52. The groove 52 is preferably machined into the inner 44 or outer 54 sidewall of the shell 34 to account for any imbalance caused by the protrusion 50 used for triggering the ignition. The machined groove 52 may also account for any imbalance caused by other internal or external abnormal shell configuration.

Figure 4:
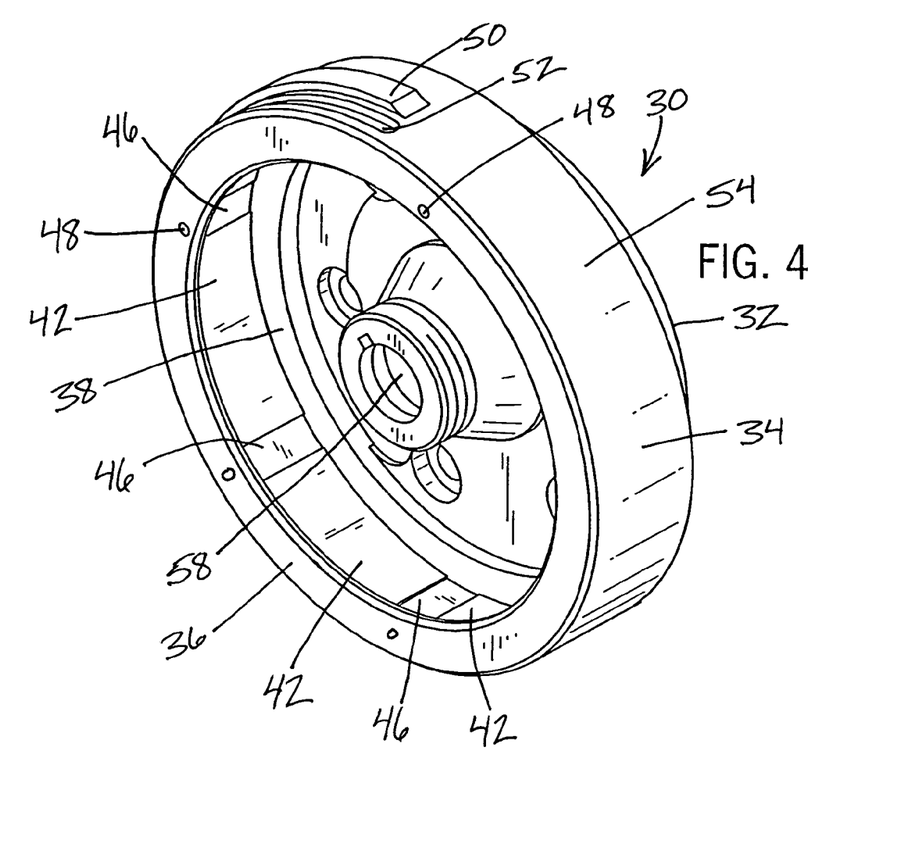
FIG. 4 is a top perspective view of an embodiment of a rotor assembly constructed in accordance with the present invention.
Figures 5, 6, 7, 8:
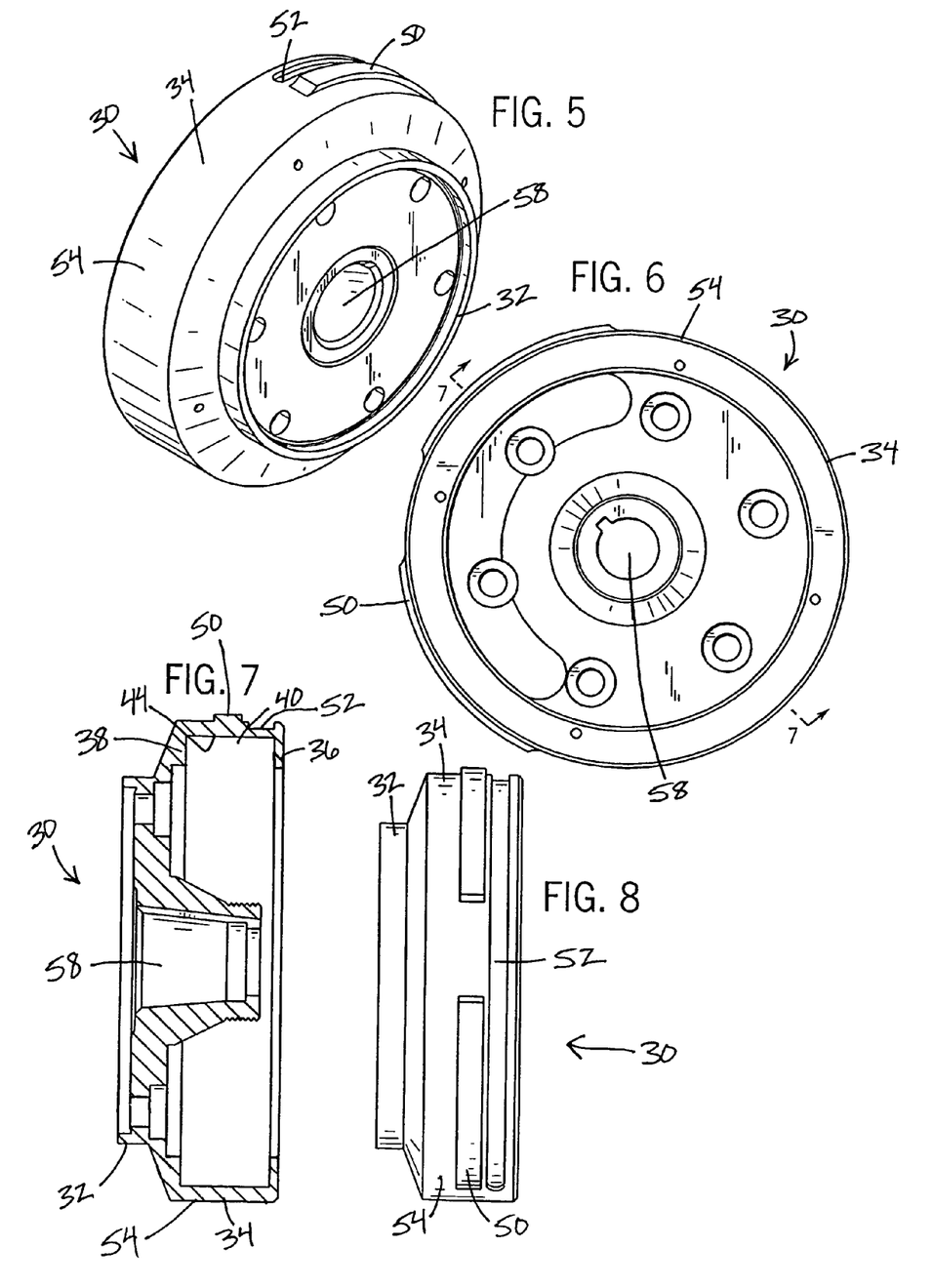
FIG. 5 is a bottom perspective view of the rotor assembly of FIG. 4.
FIG. 6 is a top plan view of the rotor assembly of FIG. 4.
FIG. 7 is a cross-sectional view of the rotor assembly of FIG. 4, taken along line 7—7 of FIG. 6 with the magnets and spacers removed.
FIG. 8 is a side plan view of the rotor assembly of FIG. 4.

FIG. 7 is a cross-sectional view of the rotor assembly 30 of FIG. 4 with the magnets 42 and spacers 46 removed. The rotor assembly 30 preferably includes a hub 32 and a shell 34 extending outwardly from one end of the hub 32, the shell 34 having an upper lip 36 and a lower lip 38 forming a pocket 40 for retaining magnets 42 and spacers 46 therein. The pocket 40 is preferably machined into the inner sidewall 44 of the shell 34 for retaining the magnets 42 and spacers 46. The magnets 42 once inserted into the pocket 40 are bounded on top and bottom by the upper lip 36 and the lower lip 38, and bounded on the sides by spacers 46 inserted between each magnet 42, providing edge protection and keeping the magnets 42 in place in the event of an adhesive bonding failure.

Figure 17:
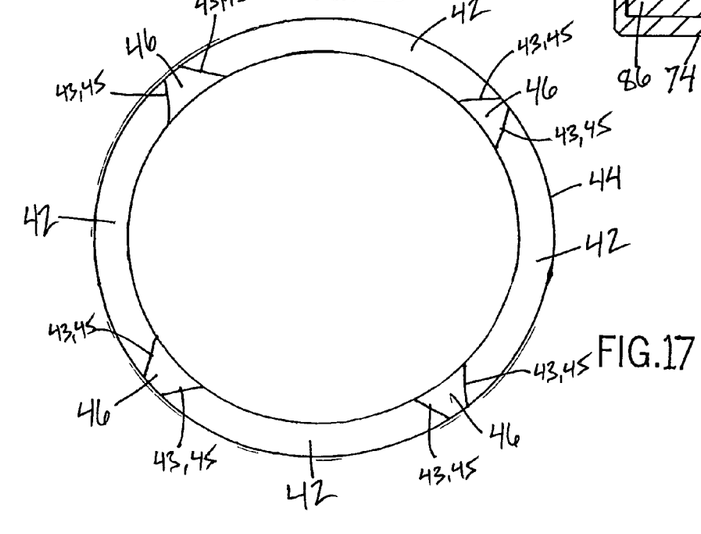
FIG. 17 is a top plan view of a plurality of spacers and magnets mounted within the embodiments of the rotor assembly constructed in accordance with the present invention.

FIG. 17 is a top plan view of a plurality of magnets 42 and spacers 46 mounted within the pocket 40 of the rotor assembly 30 constructed in accordance with the present invention. The magnets 42 are preferably bonded to the inner sidewall 44 of the shell 34 with an adhesive. The spacers 46 are preferably placed between each magnet 46 and secured in place with fasteners 48, preventing the magnets 42 from moving in the event of an adhesive bonding failure. The magnet ends 45 and the spacer ends 43 are preferably angled and in contact with one another. The magnet ends 43 are angled outwardly toward the inner sidewall 44 of the shell 34, while the spacer ends 45 are angled inwardly toward the inner sidewall 44 of the shell 34, providing an interlocking joint between each magnet and spacer end.

FIGS. 9–10 show a charging assembly 60 including a stator 62 mounted within a rotor assembly 64 constructed in accordance with the present invention. The rotor assembly 64 is preferably machined from a single piece of metal. The rotor assembly 64 comprises a circular hub 32 with a cylindrical shell 34 extending outwardly from one end of the hub 32, the shell 34 having an upper lip 36 and a lower lip 38 forming a pocket 40 for holding magnets 42 therein. The hub 32 preferably includes an opening 58 extending through the center thereof for mounting the rotor assembly 64 on the shaft of an internal combustion engine. The magnets 42 are preferably attached to the inner sidewall 44 of the shell 34 with an adhesive, and are mechanically secured in place with a plurality of spacers 46 positioned between the magnets 42. The spacers 46 are secured to the inner sidewall 44 of the shell 34 with fasteners 48. The rotor assembly 64 also preferably includes at least one triggering protrusion 50 and at least one balancing cutout 52 machined in the hub 32 or shell 34 of the rotor assembly 64. The triggering protrusion 50 is for triggering the ignition 56 of the internal combustion engine. The cutout 52 is for balancing the rotor assembly 64.

Figure 15:
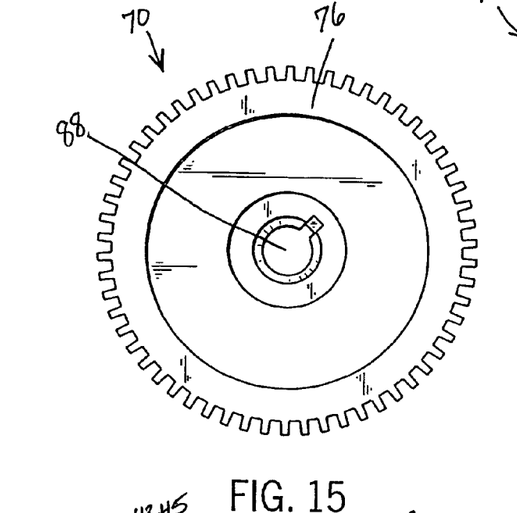
FIG. 15 is a bottom plan view of the rotor assembly of FIG. 14.
Figure 16:
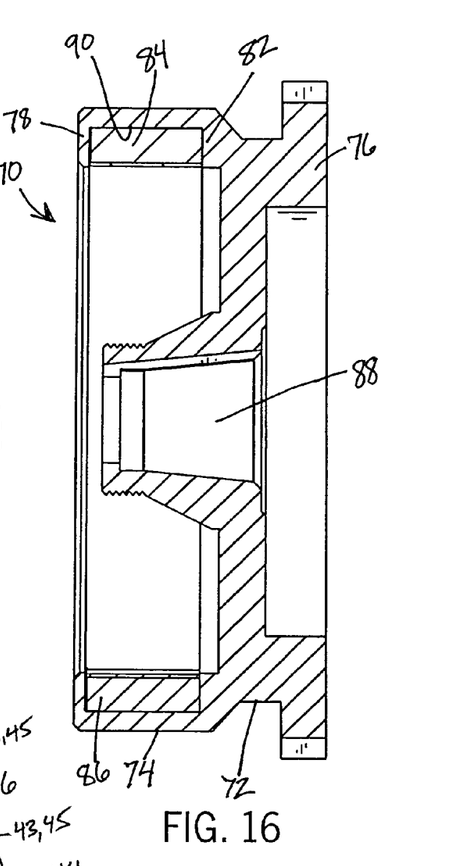
FIG. 16 is a cross-sectional view of the rotor assembly of FIG. 14, taken along line 16—16 of FIG. 14.

FIGS. 14–16 illustrate another embodiment of a rotor assembly 70 with an integral engine speed senor ring 76 machined in the bottom thereof, constructed in accordance with the present invention. Manufacturing the machined rotor assembly includes the ability to machine in a plurality of timing teeth with various configurations, the timing teeth being used for engine speed sensing, machining teeth into the rotor assembly also results in savings in tooling charges and assembly cost again with minimal machining costs. The engine speed sensor ring 76 is an integral with part of the rotor assembly, machined all in one piece. The hoop strength of the integral machined rotor assembly 70 is stronger than prior art rotor assemblies because of the machined in engine speed sensor ring 76. The rotor assembly 70 is preferably machined from a single piece of metal and comprises a circular hub 72 with a cylindrical shell 74 extending outwardly from one end of the hub 72 and the engine speed sensor ring 76 extending outwardly from the other end of the hub 72. The shell 74 preferably includes an upper lip 78 and a lower lip 82 forming a pocket 80 for holding magnets 84 therein. The hub 72 preferably includes an opening 88 extending through the center thereof for mounting the rotor assembly 70 on the shaft of an internal combustion engine. The magnets 84 are preferably attached to the inner sidewall 90 of the shell 74 with an adhesive, and mechanically secured in place with a plurality of spacers 86 positioned between the magnets 84. The spacers 86 are preferably secured to the inner sidewall 90 of the shell 74 with fasteners 92.

The present invention provides the ability for machining a rotor assembly having a plurality of rotor depths and diameters without any major increase in costs. The present invention also includes the use of a silicon sealant or other type of gasket forming material to fill any voids between components of the rotor assembly.

While the invention has been described with reference to preferred embodiments, it is to be understood that the invention is not intended to be limited to the specific embodiments set forth above. It is recognized that those skilled in the art will appreciate that certain substitutions, alterations, modifications, and omissions may be made without departing from the spirit or intent of the invention. Accordingly, the foregoing description is meant to be exemplary only, the invention is to be taken as including all reasonable equivalents to the subject matter of the invention, and should not limit the scope of the invention set forth in the following claims.

I claim:

1. A rotor assembly for an internal combustion engine comprising:
   an integral circular shaped hub with a cylindrically shaped shell;
   the shell having an upper lip and a lower lip with a pocket formed between the upper lip and the lower lip;
   a plurality of magnets mounted in the pocket formed between the upper lip and the lower lip of the shell, wherein each magnet includes two opposed sides and two opposed ends, a first side opposite a second side, the second side attached to an inner sidewall of the shell with an adhesive, a first end opposite a second end, the first and second ends angled outwardly from the first side to the second side toward the inner sidewall of the shell, wherein the second side attached to the inner sidewall of the shell is longer than the first side; and
   at least one spacer positioned between each magnet and secured in place with fasteners, wherein each spacer includes two opposed sides and two opposed ends, a first side opposite a second side, wherein the second side is positioned against the inner sidewall of the shell, a first end opposite a second end, the first and second ends angled inwardly from the first side to the second side toward the inner sidewall of the shell, wherein the second side positioned against the inner sidewall of the shell is shorter than the first side, and wherein the spacer ends are in contact with the magnet ends forming an interlocking joint to further secure the magnets in place.

2. The rotor assembly of claim 1, wherein the hub and the shell are machined as a single integral part.

3. The rotor assembly of claim 1, wherein the magnets are attached to the inner sidewall of the shell with an adhesive and mechanically secured in place with the plurality of spacers.

4. The rotor assembly of claim 1, further comprising at least one triggering protrusion machined in and extending outwardly from an outer sidewall of the shell.

5. The rotor assembly of claim 1, further comprising at least one cutout machined in and extending inwardly from an outer sidewall of the shell.

6. The rotor assembly of claim 1, further comprising at least one triggering protrusion machined in and extending outwardly from an outer sidewall of the shell and at least one cutout machined in and extending inwardly from the outer sidewall of the shell.

7. The rotor assembly of claim 1, further comprising an integral engine speed sensor ring extending outwardly from the hub.

8. The rotor assembly of claim 7, wherein the engine speed sensor ring includes a plurality of teeth extending outwardly around the outer periphery of the engine speed sensor ring.

9. A rotor assembly for an internal combustion engine comprising:
an integral circular shaped hub with a cylindrically shaped shell extending outwardly and upwardly from a first end of the hub;
the shell having an upper lip and a lower lip with a pocket formed between the upper lip and the lower lip;
a plurality of magnets mounted in the pocket formed between the upper lip and the lower lip of the shell, wherein each magnet includes two opposed sides and two opposed ends, a first side opposite a second side, the second side attached to an inner sidewall of the shell with an adhesive, a first end opposite a second end, the first and second ends angled outwardly from the first side to the second side toward the inner sidewall of the shell, wherein the second side attached to the inner sidewall of the shell is longer than the first side;
at least one spacer positioned between each magnet and secured in place with fasteners, wherein each spacer includes two opposed sides and two opposed ends, a first side opposite a second side, wherein the second side is positioned against the inner sidewall of the shell, a first end opposite a second end, the first and second ends angled inwardly from the first side to the second side toward the inner sidewall of the shell, wherein the second side positioned against the inner sidewall of the shell is shorter than the first side, wherein the spacer ends are in contact with the magnet ends forming an interlocking joint to further secure the magnets in place; and
an integral engine speed sensor ring extending outwardly from a second end of the hub opposite the first end of the hub.

10. The rotor assembly of claim 9, wherein the hub, the shell and the engine speed sensor ring are machined as a single integral part.

11. The rotor assembly of claim 9, wherein the magnets are attached to the inner sidewall of the shell with an adhesive and mechanically secured in place with the plurality of spacers.

12. The rotor assembly of claim 9, further comprising at least one triggering protrusion machined in and extending outwardly from an outer sidewall of the shell.

13. The rotor assembly of claim 9, further comprising at least one cutout machined in and extending inwardly from an outer sidewall of the shell.

14. The rotor assembly of claim 9, further comprising at least one triggering protrusion machined in and extending outwardly from an outer sidewall of the shell and at least one cutout machined in and extending inwardly from the outer sidewall of the shell.

15. The rotor assembly of claim 9, wherein the engine speed sensor ring includes a plurality of teeth extending outwardly around the outer periphery of the engine speed sensor ring.

16. A rotor assembly comprising:
a circular hub;
a cylindrical shell extending outwardly and upwardly from one end of the hub, wherein the hub and shell are machined as a single integral part;
the shell having an upper lip and a lower lip with a pocket formed between the upper lip and the lower lip;
a plurality of magnets mounted in the pocket formed between the upper lip and the lower lip of the shell, wherein each magnet includes two opposed sides and two opposed ends, a first side opposite a second side, the second side attached to an inner sidewall of the shell with an adhesive, a first end opposite a second end, the first and second ends angled outwardly from the first side to the second side toward the inner sidewall of the shell, wherein the second side attached to the inner sidewall of the shell is longer than the first side;
at least one spacer positioned between each magnet and secured in place with fasteners, wherein each spacer includes two opposed sides and two opposed ends, a first side opposite a second side, wherein the second side is positioned against the inner sidewall of the shell, a first end opposite a second end, the first and second ends angled inwardly from the first side to the second side toward the inner sidewall of the shell, wherein the second side positioned against the inner sidewall of the shell is shorter than the first side, and wherein the spacer ends are in contact with the magnet ends forming an interlocking joint to further secure the magnets in place;
at least one triggering protrusion machined in and extending outwardly from an outer sidewall of the shell; and
at least one cutout machined in and extending inwardly from the outer sidewall of the shell.

17. The rotor assembly of claim 16, further comprising an integral engine speed sensor ring extending outwardly from the hub.

18. The rotor assembly of claim 17, wherein the engine speed sensor ring includes a plurality of teeth extending outwardly around the outer periphery of the engine speed sensor ring.

* * * * *